Patented June 12, 1923.

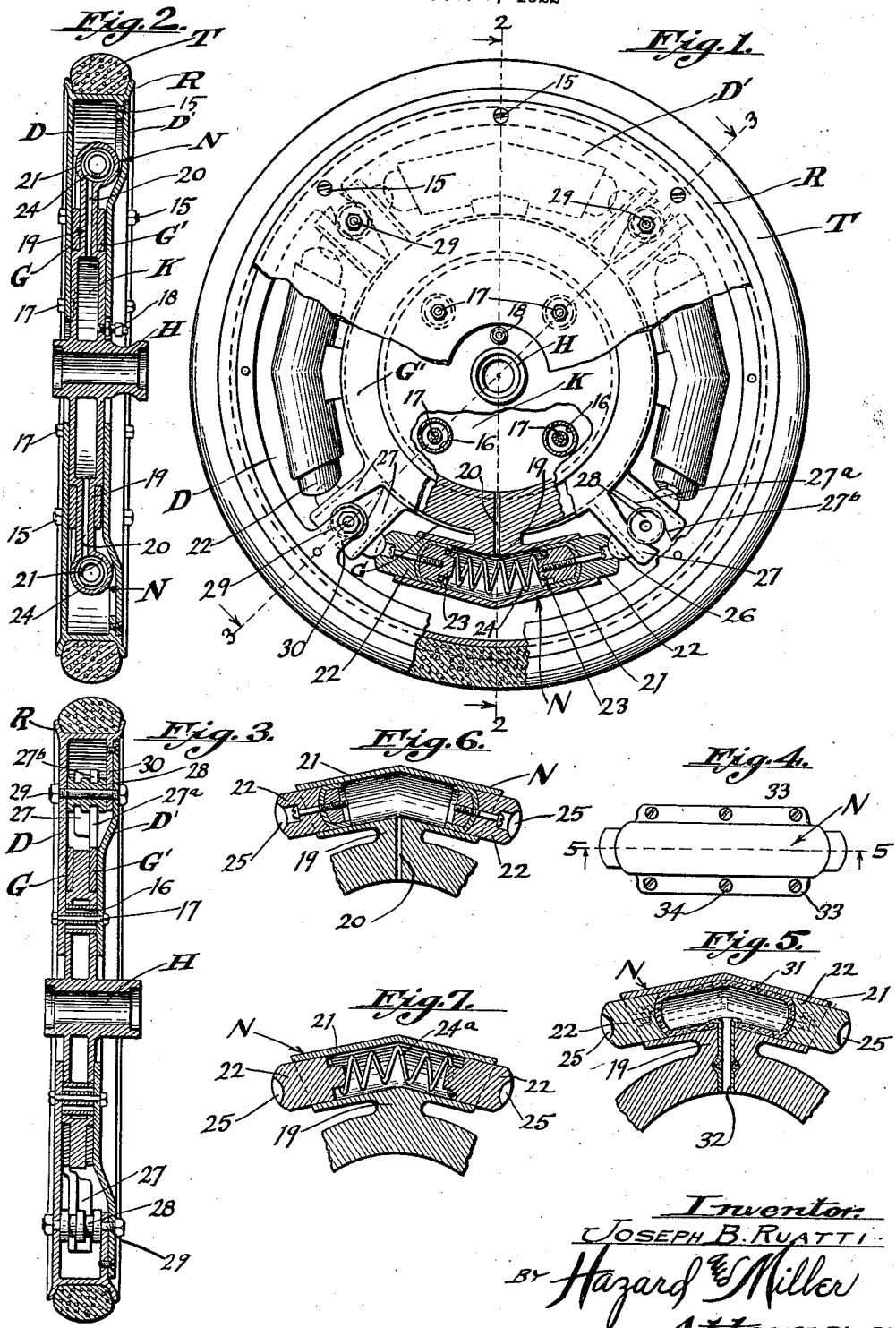

1,458,779

UNITED STATES PATENT OFFICE.

JOSEPH B. RUATTI, OF LOS ANGELES, CALIFORNIA.

WHEEL FOR MOTOR VEHICLES.

Application filed February 3, 1922. Serial No. 533,869.

*To all whom it may concern:*

Be it known that I, JOSEPH B. RUATTI, a citizen of Austria, residing at Los Angeles, in the county of Los Angeles and State of California, have invented new and useful Improvements in Wheels for Motor Vehicles, of which the following is a specification.

My invention relates to resilient wheels for vehicles, and a purpose of my invention is the provision of a resilient wheel which eliminates the use of pneumatic tires and which operates to effectively prevent the transmission of shocks and vibrations of the wheel to the axle of a vehicle.

I will describe one form of resilient wheel embodying my invention and will then point out the novel features thereof in claims.

In the accompanying drawings,

Figure 1 is a view showing in side elevation with portions thereof broken away one form of resilient wheel embodying my invention.

Figs. 2 and 3 are sectional views taken on the lines 2—2 and 3—3, respectively, of Fig. 1.

Fig. 4 is a top plan view showing a modified form of piston and cylinder unit.

Fig. 5 is a longitudinal sectional view taken on the line 5—5 of Fig. 4.

Figs. 6 and 7 are views similar to Fig. 5 showing other forms of cylinder and piston units embodying my invention.

Similar reference characters refer to similar parts in each of the several views.

Referring specifically to the drawings my invention, in its present embodiment, comprises a wheel rim R in which is seated a solid tire T and extending inwardly from and formed integral with the rim is a disc D, while at the opposite side of the wheel another disc D' is secured to the rim by means of screws 15. The discs D and D' are formed axially with openings in which is arranged a hub portion H and formed integral with this hub portion is a hollow casing K slidably fitted between the discs D and D' and formed with transverse openings 16 through which bolts 17 extend for securing the discs to each other in such manner as to slidably receive the casing K. By reference to Fig. 1, it will be seen that the openings 16 are sufficiently large to allow of a limited lateral movement of the bolts 17 for the purpose of permitting a restricted movement of the discs and consequently the rim with respect to the hub portion H.

The casing K constitutes an air reservoir in which air under pressure is adapted to be stored and introduced through a valve stem 18 (Fig. 2). As shown in Figs. 1 and 2, this casing K is provided with radial extensions 19 having ducts 20 provided therein and through which air from the reservoir is adapted to pass into piston and cylinder units designated generally at N.

As shown in Fig. 1, each unit N comprises a tubular member 21 which is bent to provide angularly disposed cylinders, with each cylinder slidably receiving a plunger or piston 22 provided with the necessary packing to render it responsive to the action of the air from the reservoir K. The confronting ends of the pistons are formed with projections 23 designed to form seats for the opposite ends of an expansible spring 24 which serves to normally urge the pistons to the outer ends of the cylinders, as will be understood. The outer ends of the pistons are formed with recesses 25 adapted to receive lugs 26 formed on arms 27 which operate to move the piston inwardly of the cylinders against the cushioning action of the springs and air. The arms 27 are arranged in pairs with each pair disposed between the confronting ends of the piston and cylinder units, and the confronting edges thereof formed with oppositely inclined cam surfaces 27$^a$ and 27$^b$ which engage with a roller 28 mounted on a bolt 29 and grooved to receive the arms as is clearly shown in Fig. 3. The bolts 29 are mounted on extensions 30 which are formed integral with and extend inwardly from the rim R. One arm of each pair is formed integral with a ring G or G', and these rings are disposed at opposite sides of the casing K as shown in Figs. 2 and 3 and in such manner as to have rotational movement thereon.

In the operation of the wheel it is to be understood that the hub H receives the axle of the vehicle, and by virtue of the openings 16 and the bolts 17, a limited degree of movement of the discs D and D' and the rim R is permitted and independently of the casing K. In practice, upward or downward movement of the rim R causes the rollers 28 to ride over the inclined surfaces of the arms, and in so doing a lateral spreading of the arms is effected, it being understood that all of the arms of one ring G or G' move in one direction, while all of the arms of the other ring move in the opposite direction. The movement of either set of arms is opposed by the air and springs acting upon the pistons 22 but only yieldingly so as to effectively absorb the shocks transmitted to the rim and thereby preventing the transmission of such shocks to the hub H and consequently the axle of the vehicle. It is to be understood that the shock absorbing properties of the wheel can be increased or decreased at will by varying the pressure of air within the casing K thus accommodating the wheel to heavy or light service as the case may be.

In Figs. 4 and 5, I have shown a modified form of piston and cylinder unit in which an expandible tube 31 is interposed between the pistons 22 and normally inflated by the air from the casing K through a tube 32 arranged within the duct 20. The cylinders in the present instance are formed of two sections provided with flanges 33 through which screws 34 or other suitable fastening members extend for securing the sections in cylinder formation, and thus facilitating the substitution of new tubes 31 should the latter become worn.

In Fig. 6, the piston and cylinder unit is without the expansible spring 24, as it is possible to operate the units solely by the pressure of air contained in the cylinders. In Fig. 7 the employment of compressed air is dispensed with and a spring 24ª is used to retard the inward movement of the pistons as will be understood. In this embodiment of my invention the necessity of providing a hollow casing K is eliminated. It is to be understood that in all of the piston and cylinder units, suitable provision may be made for effectively lubricating the pistons to effect their proper operation.

Although I have herein shown and described only one form of resilient wheel and various forms of piston and cylinder units all embodying my invention, it is to be understood that various changes and modifications may be made herein without departing from the spirit of the invention and the spirit and scope of the appended claims.

What I claim is:

1. A resilient wheel comprising a hub, a rim, a casing movably sustained on the hub, an annular series of piston and cylinder units between the casing and rim, rollers carried by the rim, and cam arms sustained on the casing and engageable by said rollers for actuating said units whereby radial movement of the rim is cushioned by said units.

2. A resilient wheel comprising a hub, a rim movable with respect to the hub, a hollow casing movably sustained on the hub and constituting a fluid reservoir, an annular series of piston and cylinder units between the casing and said rim, each of said units comprising a pair of opposed cylinders communicating with the interior of the casing for receiving fluid therefrom, and pistons movable within the cylinders, rings arranged at opposite sides of the casing and mounted for oscillatory movement, cam arms sustained on the rings, and rollers carried by the rim and engageable with the arms for actuating the latter upon radial movement of the rim to operate said pistons against the action of the fluid.

3. A resilient wheel comprising a hub, a rim movable with respect to the hub, a hollow casing movably sustained on the hub and constituting a fluid reservoir, an annular series of piston and cylinder units between the casing and said rim, each of said units comprising a pair of opposed cylinders communicating with the interior of the casing for receiving fluid therefrom, and pistons movable within the cylinders, cam arms movably sustained on the casing, said arms being arranged in pairs and having operative connection with said pistons, and rollers carried by the rim and interposed between each pair of arms.

4. A resilient wheel comprising a hub, a rim movable with respect to the hub, a hollow casing movably sustained on the hub and constituting a fluid reservoir, an annular series of piston and cylinder units between the casing and said rim, each of said units comprising a pair of opposed cylinders communicating with the interior of the casing for receiving fluid therefrom, and pistons movable within the cylinders, expansible springs interposed between adjacent pistons, rings arranged at opposite sides of the casing and mounted for oscillatory movement, cam arms sustained on the rings, and rollers carried by the rim and engageable with the arms for actuating the latter upon radial movement of the rim to operate said pistons against the action of the fluid.

5. A resilient wheel comprising a hub, a rim, a hollow casing formed on the hub, discs carried by the rim and slidably associated with the casing, a series of piston and cylinder units sustained on the casing and interposed between the latter and said rim and between said discs, each of said units including a pair of opposed cylinders having communication with the interior of said casing, pistons within the cylinders, and springs between each pair of pistons, a pair of rings rotatably associated with the casing, cam arms formed at intervals on each of the rings and in such manner that one cam arm of one ring is disposed adjacent one cam arm of the other ring, means for operatively connecting said arms with said pistons, and rollers carried by the rim and interposed between said arms for effecting actuation of said pistons inwardly of the cylinders when said rim is moved radially.

6. A resilient wheel comprising a hub, a rim movable with respect to the hub, a fluid reservoir, an annular series of piston and cylinder units between the casing and rim, each of said units comprising a pair of cylinders communicating with the interior of the casing for receiving fluid therefrom, and pistons movable within the cylinders, and means operable by radial movement of the rim for actuating the pistons against the action of the fluid.

In testimony whereof I have signed my name to this specification.

JOSEPH B. RUATTI.